J. P. RAY.
Sheep Rack.
No. 48,093.
Patented June 6, 1865.
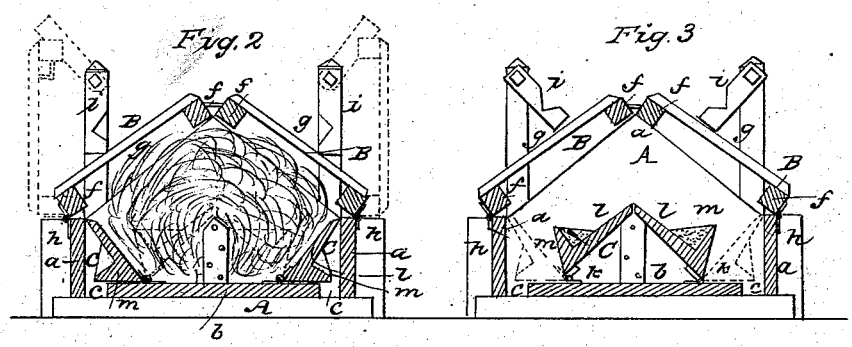
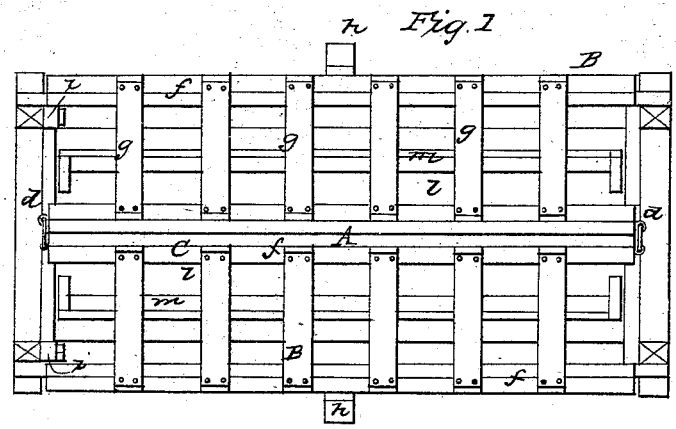
Witnesses
R. F. Osgood
J. A. Davis
Inventor
John P Ray
By J Fraser & Co
Attys

UNITED STATES PATENT OFFICE.

JOHN P. RAY, OF HONEOYE, NEW YORK, ASSIGNOR TO HIMSELF AND WESLEY W. RAY, OF SAME PLACE.

IMPROVEMENT IN SHEEP-RACKS.

Specification forming part of Letters Patent No. 48,093, dated June 6, 1865.

*To all whom it may concern:*

Be it known that I, JOHN P. RAY, of Honeoye, in the county of Ontario and State of New York, have invented a new and useful Improvement in Racks for Feeding Sheep; and I do hereby declare that the following is a full and exact description thereof, reference being had to the accompanying drawings, making part of this specification.

Figure 1 is a plan of my improved rack; Fig. 2, a vertical transverse section of the same in the condition for feeding hay to the sheep; Fig. 3, a similar section in the condition for feeding grain.

Like letters of reference indicate corresponding parts in all the figures.

My improvement is adapted to feeding either hay or grain to the sheep by a mere change of the arrangement; and the invention consists, essentially, in the employment of two hinged racks capable of opening to admit the feed and of closing to compress and hold it, and a double trough or receptacle on the inside to hold grain, made in two parts, so arranged that in feeding hay they turn back against the sides to leave the central space unoccupied, but in feeding grain close together in the center, so as to hold the same in proper position to be reached by the sheep.

As represented in the drawings, a suitable rectangular box, A, is made of suitable capacity to hold the necessary amount of hay to feed to the sheep at once. This box is composed of sides $a\ a$ and a bottom, $b$, whose transverse width is somewhat less than that between the sides, so as to leave longitudinal spaces $c\ c$ at the edges sufficient to easily clear the box of dirt and trash whenever it is necessary, without inverting it. To complete the box, ends $d\ d$, of angular or roof shape, preferably, are employed.

To the top edges of the sides $a\ a$ are hinged racks proper, B B, composed of rails $f\ f$ and cross-slats $g\ g$, at suitable distance apart, in the form of a ladder. These racks shut together, and are held by means of catches, hasps, clasps, or some equivalent arrangement, either at the center or at the ends, as may be desired. The racks are allowed to be raised to a vertical position, or a little more, when they strike shoulders or stops $h\ h$ at the sides of the box, to prevent them from falling over. When thus raised, the racks are prevented from falling back again by buttons $i\ i$ or equivalent, that are braced against them.

To the bottom $b$ of the box are hinged at $k\ k$ the halves or sections $l\ l$ of a grain trough or receptacle, C, which, when opened, as in Fig. 2, rests in an angular or inclined position against the sides $a\ a$, so as to leave the whole interior space of the box unobstructed; but when closed, as in Fig. 3, shut together in the center, thereby forming a double-sided receptacle for the grain, which is retained by flanges $m\ m$, as clearly represented.

The operation of this device is obvious. In feeding with hay the racks B B are elevated, as represented in red lines, Fig. 2. The box is then filled with the hay, and the racks crowded down upon it and fastened together. This compresses the material into a very small compass, and the sheep cannot waste it by pulling the hay downward, as in ordinary devices, since they are obliged to feed upward. The grain-trough, by inclosing and shutting backward, as in Fig. 2, leaves the whole interior of the box unobstructed, so a large quantity of hay can be compressed into a very small compass. When feeding grain, the trough is shut into the position indicated in Fig. 3, which raises the grain within reach of the sheep and allows them to feed on both sides of the rack.

I am aware of no device prior to my invention of the same in which the trough can be opened and closed in the manner described, and which either leaves the interior of the box unobstructed, or elevates the grain so that the sheep can easily reach it.

What I claim as my invention, and desire to secure by Letters Patent, is—

1. The grain trough or receptacle C, constructed in sections $l\ l$, so arranged as to open and rest against the sides of the box, or to close centrally to feed the sheep, the same being used in combination with the box A, substantially as described.

2. In combination with the grain-trough, constructed as described, the double folding and compressing racks B B, arranged and operating substantially as specified.

In witness whereof I have hereunto signed my name in the presence of two subscribing witnesses.

JOHN P. RAY.

Witnesses:
R. F. OSGOOD,
J. A. DAVIS.